United States Patent [19]
Bejster et al.

[11] Patent Number: 5,680,098
[45] Date of Patent: Oct. 21, 1997

[54] CIRCUIT FOR COMPENSATING FOR FAILURE OF A LIGHT SOURCE IN AN AUTOMOTIVE VEHICLE

[75] Inventors: Joseph V. Bejster, Dearborn; James E. Blatchford; Patrick W. Gibson, both of Northville; Gary J. Rushton, Warren; Trevor Williams, Ann Arbor; Robert S. Zabinski, Southfield, all of Mich.

[73] Assignee: Ford Motor Company, Dearborn, Mich.

[21] Appl. No.: 534,997

[22] Filed: Sep. 27, 1995

[51] Int. Cl.⁶ .................................................. B60Q 11/00
[52] U.S. Cl. .................. 340/458; 340/475; 340/479; 340/641; 315/77; 315/82; 315/88
[58] Field of Search .................................. 340/458, 641, 340/642, 475, 479, 931; 307/10.8; 315/77, 82, 83, 88, 129–133, 291, 307

[56] References Cited

U.S. PATENT DOCUMENTS

| | | | |
|---|---|---|---|
| 3,558,972 | 1/1971 | Arai | 315/83 |
| 3,728,705 | 4/1973 | Atkins | 340/642 |
| 3,883,777 | 5/1975 | Morita | 315/88 |
| 4,222,047 | 9/1980 | Finnegan | 340/641 |
| 4,309,639 | 1/1982 | Thrower et al. | 315/82 |
| 4,380,718 | 4/1983 | Miller | 340/642 |
| 4,495,444 | 1/1985 | Thomas | 315/82 |
| 4,527,095 | 7/1985 | Herring | 315/88 |
| 4,667,187 | 5/1987 | Volk et al. | 340/641 |
| 5,061,879 | 10/1991 | Munonz et al. | 340/642 |
| 5,075,669 | 12/1991 | Nakadozono et al. | 340/458 |
| 5,081,565 | 1/1992 | Nabha et al. | 340/468 |
| 5,182,494 | 1/1993 | Segaud | 315/80 |
| 5,194,779 | 3/1993 | Segoshi et al. | 315/82 |
| 5,216,328 | 6/1993 | Lu | 315/88 |
| 5,231,373 | 7/1993 | Freeman et al. | 340/469 |
| 5,254,971 | 10/1993 | Sutterlin et al. | 340/458 |
| 5,331,214 | 7/1994 | Mori et al. | 307/10.8 |
| 5,355,119 | 10/1994 | Pearlman | 340/468 |
| 5,382,877 | 1/1995 | Katsumata et al. | 315/82 |
| 5,491,383 | 2/1996 | Leiber et al. | 315/77 |
| 5,517,064 | 5/1996 | Murakami | 340/458 |

FOREIGN PATENT DOCUMENTS

| | | | |
|---|---|---|---|
| 1 438 134 | 9/1973 | United Kingdom | 315/89 |
| 2 240 440 | 12/1990 | United Kingdom | 315/89 |

*Primary Examiner*—Brent A. Swarthout
*Assistant Examiner*—Van T. Trieu
*Attorney, Agent, or Firm*—Roger L. May

[57] ABSTRACT

A circuit for compensating for failure of a light source includes a first light source having a first function and a first intensity associated therewith and a second light source having a second function and a second intensity associated therewith. A controller is connected to the first and second light sources, for detecting a current to the first light source. Upon detection of a failure of the first light source, the controller modulates the second light source to provide the function of the first light source with a substantially the first intensity.

5 Claims, 2 Drawing Sheets

5,680,098

CIRCUIT FOR COMPENSATING FOR FAILURE OF A LIGHT SOURCE IN AN AUTOMOTIVE VEHICLE

BACKGROUND OF THE INVENTION

The present invention relates to a lighting system for an automotive vehicle. More particularly, the invention relates to a lighting system for an automotive vehicle providing compensation for failure of a light source in the lighting system.

Many developments have been proposed for compensating for the failure of a light in a lighting system. Several systems propose the use of a lamp having two filaments. The second filament would illuminate upon the failure of the first filament and thus provide a back up to the first filament. However, when mass producing an automobile providing each bulb with two filaments is cost prohibitive.

Another method for compensating for a failure of a bulb in an automotive vehicle is disclosed in UK Patent 2,240,440. In this patent a system is disclosed wherein a separate lamp is illuminated to replace a failed lamp. One disadvantage with this solution is that no compensation is provided for the intensity of the particular lamps. Automotive applications have different intensities corresponding to the different functions of the lamp. Another disadvantage of this solution is that separate wires must be run between each of the lamps and their substitutes. However, addition wiring is also cost prohibitive and is preferably avoided.

It would therefore be desirable to provide an automotive lighting system to compensate for a failed bulb in a low cost manner while providing a close approximation to the relative intensity of the bulb it replaces.

BACKGROUND OF THE INVENTION

One advantage of the present invention is that no further wiring need be provided if the vehicle already has a multiplexed system.

The present invention includes a first light source having a first function and a first intensity associated therewith and a second light source having a second function and a second intensity associated therewith. A controller is connected to the first and second light sources, for detecting a current to the first light source. Upon detection of a failure of the first light source, the controller modulates the second light source to provide the function of the first light source with substantially the first intensity.

DETAILED DESCRIPTION OF THE PREFERRED EMBODIMENT

Figure 1:
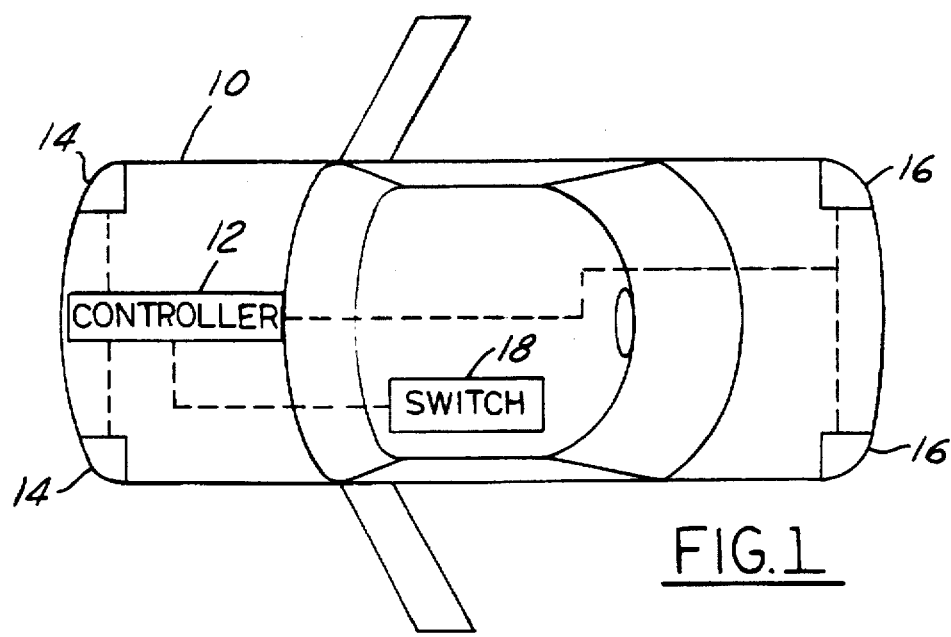
FIG. 1 is an automobile having a lighting system according to the present invention.

Referring to FIG. 1, an automotive vehicle 10 has a lighting system. The lighting system has a controller 12 that is used to control the operation of front lights 14 and rear lights 16. A switch 18 is used to signal controller 12 as to which front lights 14 or rear lights 16 should be operational. For simplicity, switch 18 is shown as a single element. However, switch 18 actually represents the many switches used to control front lights 14 and rear lights 16, as will be evident below.

Figure 2:
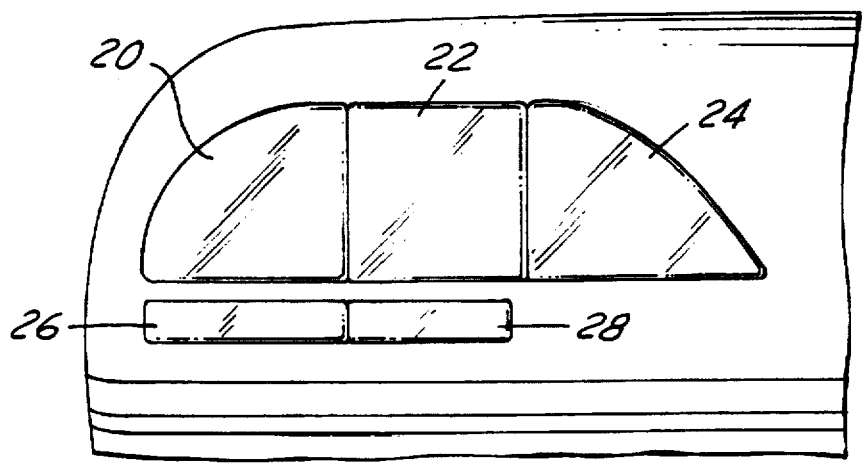
FIG. 2 is haft of the front lights of an automobile.

Referring now to FIG. 2, front lights 14 are typically located on the right and left side of the vehicle. However, front lights 14 are symmetrical on either side of the vehicle. Front lights 14 consist of a low beam lamp 20, a high beam lamp 22, a fog lamp 24, a front turn indicator lamp 26, and a front parking lamp 28. A vehicle may contain different arrangements of these lamps.

Low beam lamp 20 is used to illuminate an area close to the vehicle. High beam lamp 22 is used to illuminate an area further from the vehicle than low beam lamp 20. High beam lamp, as a consequence, is of a higher intensity than low beam lamp 20. Fog lamp 24 illuminates an area different from that of high beam lamp 22 and low beam lamp 20. Front turn indicator lamp 26 is used as an indication as to whether the vehicle will be turning. Front turn indicator lamp 26 alternates between on and off to indicate turning. The front park lamp 28 is used as a marker lamp and can be turned on separate from low beam lamp 20. Typically, front turn indicator lamp 26 and front park lamp 28 are amber in color.

Figure 3:
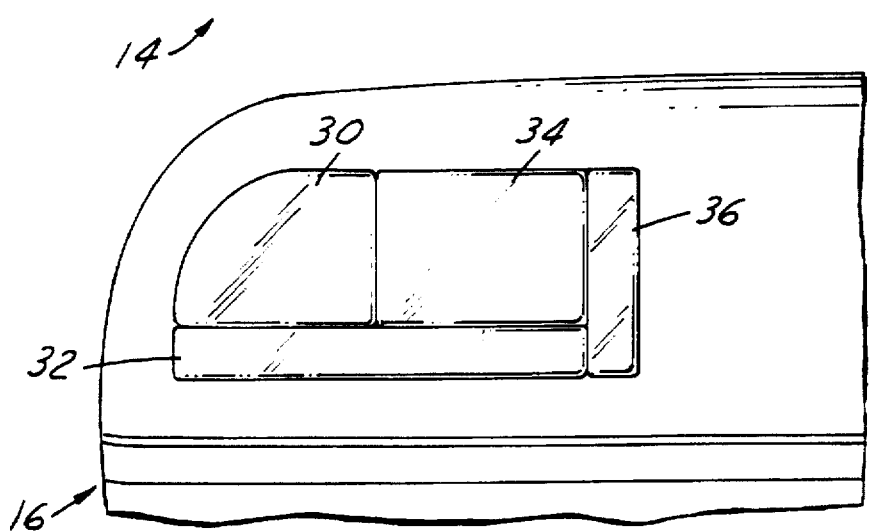
FIG. 3 is haft of the rear lights of an automobile.

Referring now to FIG. 3, rear lights 16 are shown for only one side of the vehicle. Rear lights have a rear park lamp 30, a rear turn indicator lamp 32, a brake lamp 34, and a reverse lamp 36. Rear park lamps 30 are illuminated when the front park lamps 28 are illuminated. Rear park lamps 30 are used at night so that approaching vehicles see the vehicle. Rear turn indictor lamp 32 operates when front indicator lamp 26 operates. Brake lamp 34 operates when the brake pedal of the vehicle is being depressed. Reverse lamp 36 operates when the care is placed into the reverse gear. Each of rear lights 16 has a relatively different function, and a relatively different intensity associated with those functions. For example, the turn and brake lamps have a greater intensity than the park lamps.

Figure 4:
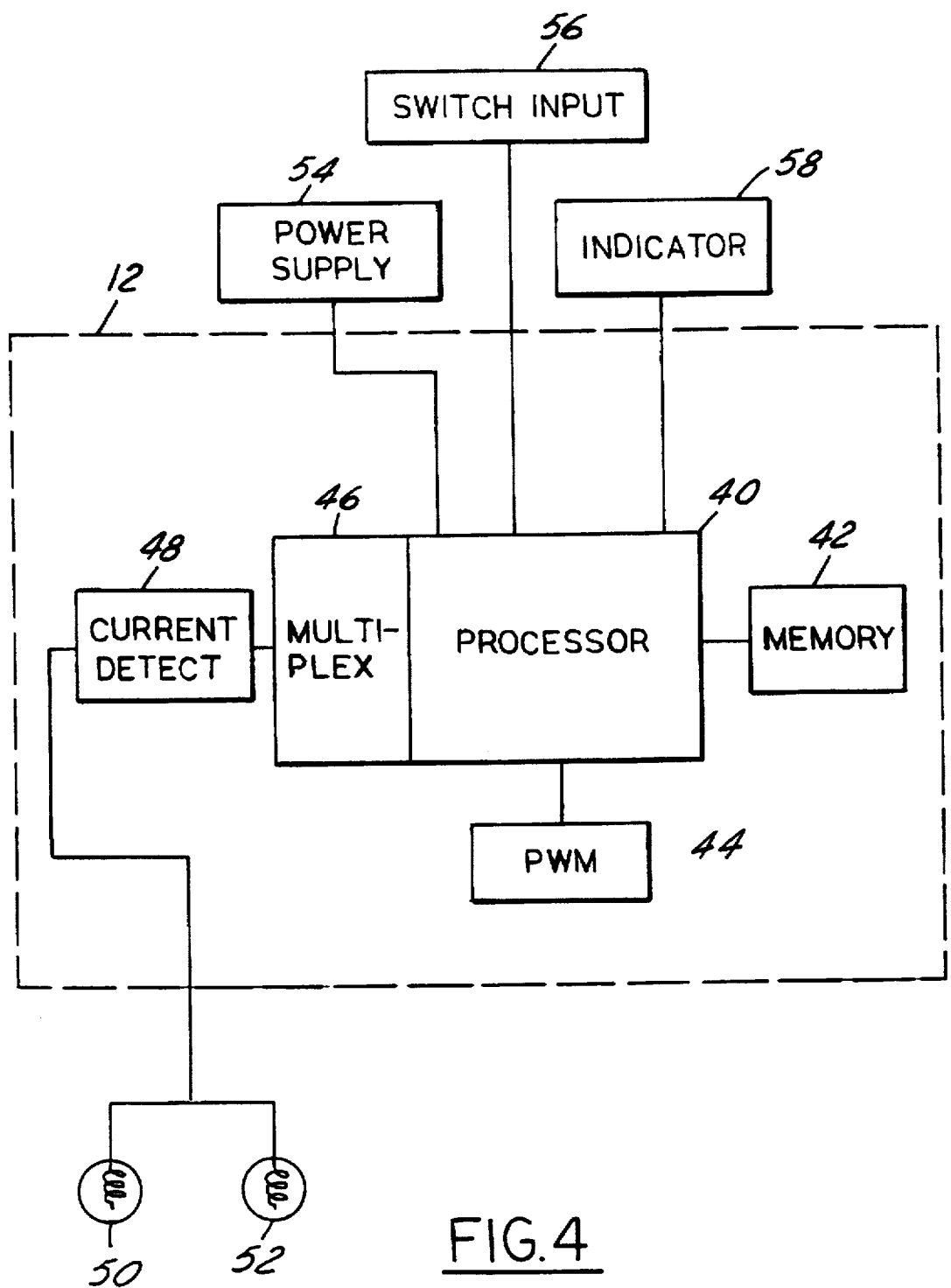
FIG. 4 is a block diagram of a system according to the present invention.

Referring now to FIG. 4, controller 12 has a processor 40 used to control the operation of the lighting system. As shown, processor 40 has several function blocks around it. These blocks may be a part of the internal functioning of the processor itself, but are shown separately for illustration purposes. Controller 12 has a memory 42, a pulse width modulator 44, a multiplexer 46 and a current detector 48. Controller 12 is used to control lamps 50 and 52. Lamps 50 and 52 are shown to represent two separate functioning lamps on the same side of the vehicle, as will be described further below. External to controller 12 is a power supply 54, a switch input 56, and an indicator 58.

When one of two adjacent lamps fails, processor 40 reconfigures the adjacent lamp to perform the function of the failed lamp. Memory 42 is used to store the information for each lamp. For example, memory 42 stores the information necessary to configure one lamp to have the same intensity as its adjacent lamp. In particular, memory 42 stores the information so that the duty cycle of the still functioning lamp can be changed to the duty cycle, with the duty cycle to provide the function and intensity of the failed lamp. The function may include cycling on and off if the failed bulb is a turn signal. A pulse width modulator 44 is used to adjust the duty cycle of the operating lamp to simulate the function of a failed lamp. Multiplexer 46 is the communication link to the interconnection network to each of the lamps. Processor 40 sends signals via multiplexer 46 to each of the lamps based on the input from switch input 56. Switch input 56 provides information to processor 40 as to whether each of the lamps should be illuminated. Multiplexer 46 then communicates this information via a vehicle network.

Current detector 48 provides processor 40 with feedback as to the operation of the lamps. For example, current detector 48 can provide open circuit detection and short circuit detection to processor 40. Also, current detector 48 may provide information as to whether the communication network has failed.

Power supply 54 is used to power processor 40 and power the lamps connected to processor 40. A typical automotive supply is twelve volts.

An indicator 58, such a dash light or an audible indicator, is used to provide information to the vehicle operator as to the operation of the vehicle lamps. For example, indicator 58 may be used to notify the vehicle operator a particular lamp has failed. Preferably, indicator 58 is a dash lamp.

In operation, when current detector 48 senses a failure of a lamp, processor 40 determines which adjacent lamp should provide the function of the failed lamp. Once that determination has been made, processor 40 retrieves information from memory 42 for determining the duty cycle of the substitute lamp. Pulse width modulator 44 is used to change the duty cycle of the substitute lamp to emulate the failed lamp, when desired. Upon detection of a lamp failure, indicator 58 provides information to the vehicle operator. Switch input 56 informs the processor which of the lamps should normally be operated.

Several lamps can be used to provide the function of its adjacent lamp. For example, upon the failure of a low beam lamp 20, the duty cycle of high beam lamp 22 can be reduced to emulate the function of the low beam lamp. It should be noted, however, that the reflector of high beam lamp may not be aimed in accordance with governmental regulations, so the duty cycle of high beam lamp may be reduced to provide only a minimum amount of light during failure of high beam lamp, or low beam lamp 20.

High beam lamp 22 may be also used to provide a daytime running lamp function. Daytime running lamps typically are operated at 50% of the intensity of high beam lamp 22. If high beam lamp 22 fails, either low beam lamp 20 or fog lamp 24 may be modulated to provide the daytime running lamp function.

If turn signal indicator lamp 26 fails, front park lamp 28 may function as a turn signal indication. Front park lamps 28, in order to provide the turn indication function, need only be modulated when signaling a turn is required. When signaling of a turn is not required, parking lamp 28 can remain providing the parking lamp function, but when turn indication is required, the intensity of park lamp 28 is increased and alternated between on and off states to simulate turn signal indicator lamp 26.

Rear park lamp 30 can be used to provide the function of rear turn indicator lamp 32 or brake lamp 34. Rear turn indicator lamp 32 may also be used as a brake lamp or a park lamp. If the turn signal function fails, rear turn indicator lamp 32 or rear park lamp 30 functions normally until the turn indicator lamp function is desired, then rear turn indicator lamp 32 or rear park lamp 30 may also act as a rear turn indicator. Rear turn indicator lamp 32 or rear park lamp 30 would also act as a brake lamp so that when the brake lamp function is desired, rear turn indicator lamp would have the intensity of a brake lamp.

Reverse lamp 36 may also provide the function of a turn signal rear turn indicator or even a brake lamp.

Current detector 48 may also sense when communication of the multiplexer has been lost. If communication has been lost, current detector 48 may provide a back up and illuminate the headlamps of the vehicle and rear park lamps.

Various modifications would be evident to those skilled in the art. For example, substitution of lamps other than those disclosed herein may be made.

We claim:

1. A lighting system for an automotive vehicle comprising:

a first light source having a first function and a first duty cycle associated therewith;

a second light source having a second function and a second duty cycle associated therewith;

a memory storing said first and second functions; and a control means connected to said first and second light sources and said memory, for activating said first and second light sources according to said first and second functions stored in said memory, said control means detecting a current to said a first light source, upon detection of a failure of said first light source changing said duty cycle of said second light source to provide said first function.

2. A lighting system for an automotive vehicle as recited in claim 1 wherein the first light source is a low beam headlamp and the second light source is a high beam headlamp.

3. A lighting system for an automotive vehicle as recited in claim 1 wherein the first light source is a turn signal lamp and the second light source is a park lamp.

4. A lighting system for an automotive vehicle as recited in claim 1 wherein the first light source is a brake lamp and the second light source is a park lamp.

5. A lighting system for an automotive vehicle as recited in claim 1 wherein the first light source is a turn signal lamp and the second light source is a brake lamp.

* * * * *